July 28, 1959   E. H. JUSTICE   2,896,582
GATE VALVE SNUBBING MECHANISM
Filed April 16, 1958   2 Sheets-Sheet 1

INVENTOR.
ELMER H. JUSTICE
BY Ely, Frye & Hamilton
ATTORNEYS

United States Patent Office 2,896,582
Patented July 28, 1959

2,896,582

GATE VALVE SNUBBING MECHANISM

Elmer H. Justice, Greensburg, Kans., assignor to Shafer Valve Company, Mansfield, Ohio, a corporation of Ohio Application April 16, 1958, Serial No. 728,908

6 Claims. (Cl. 121—38)

The invention relates generally to means for snubbing or reducing the final opening or closing pressure applied to a gate valve, so that less resistance is offered by the valve element to normal starting pressure in the opposite direction. More particularly, the invention relates to improvements in gate valve snubbing mechanism of the type shown in prior Patent No. 2,783,742, granted March 5, 1957.

In said Patent No. 2,783,742, at each end of the hydraulic valve operator cylinder a snubber valve is provided through which hydraulic fluid is alternately admitted and exhausted as the operator piston reciprocates to open and close the gate valve. As the piston nears the end of its stroke in either direction it contacts and closes one of the snubber valves, after which fluid in that end of the cylinder exhausts through a relief valve set at a predetermined pressure, so that the pressure applied to the gate valve by the piston is reduced by the amount at which the relief valve is set.

One difficulty with a snubbing mechanism of this type is that the relief valves are set by adjusting their springs to open at a reduced pressure having a certain optimum ratio to the normal line pressure which operates the piston of the operator, but when the line pressure varies this ratio is not maintained and optimum snubbing results are not obtained.

Another difficulty is that the piston does not bottom at the end of its stroke, and if any air or gas or frothy hydraulic fluid remains in that end of the cylinder when pressure is relieved on the opposite side of the piston, such air or gas tends to expand and create sufficient pressure to raise the piston but insufficient to open the relief valve to exhaust.

The principal object of the present invention is to utilize a pre-determined proportion of the line pressure actuating the operator piston to urge the exhaust side relief valve to normal closed position, and to relieve said relief valve closing pressure when the line pressure on the opposite side of the piston is relieved.

Another object is to provide a simple, inexpensive and effective system which will overcome the foregoing difficulties.

These and other objects are accomplished by the improvements comprising the present invention, a preferred embodiment of which is shown by way of example in the accompanying drawing, and described in detail herein. Various modifications and changes in details are included in the scope of the invention defined in the appended claims.

While the gate valve operator is shown by way of example connected to a control system for operating a gate valve in a pipe line, using pipe line pressure, it is to be understood that within the scope of this invention the operator may be operated with fluid pressure derived from any suitable source.

Figure 1:
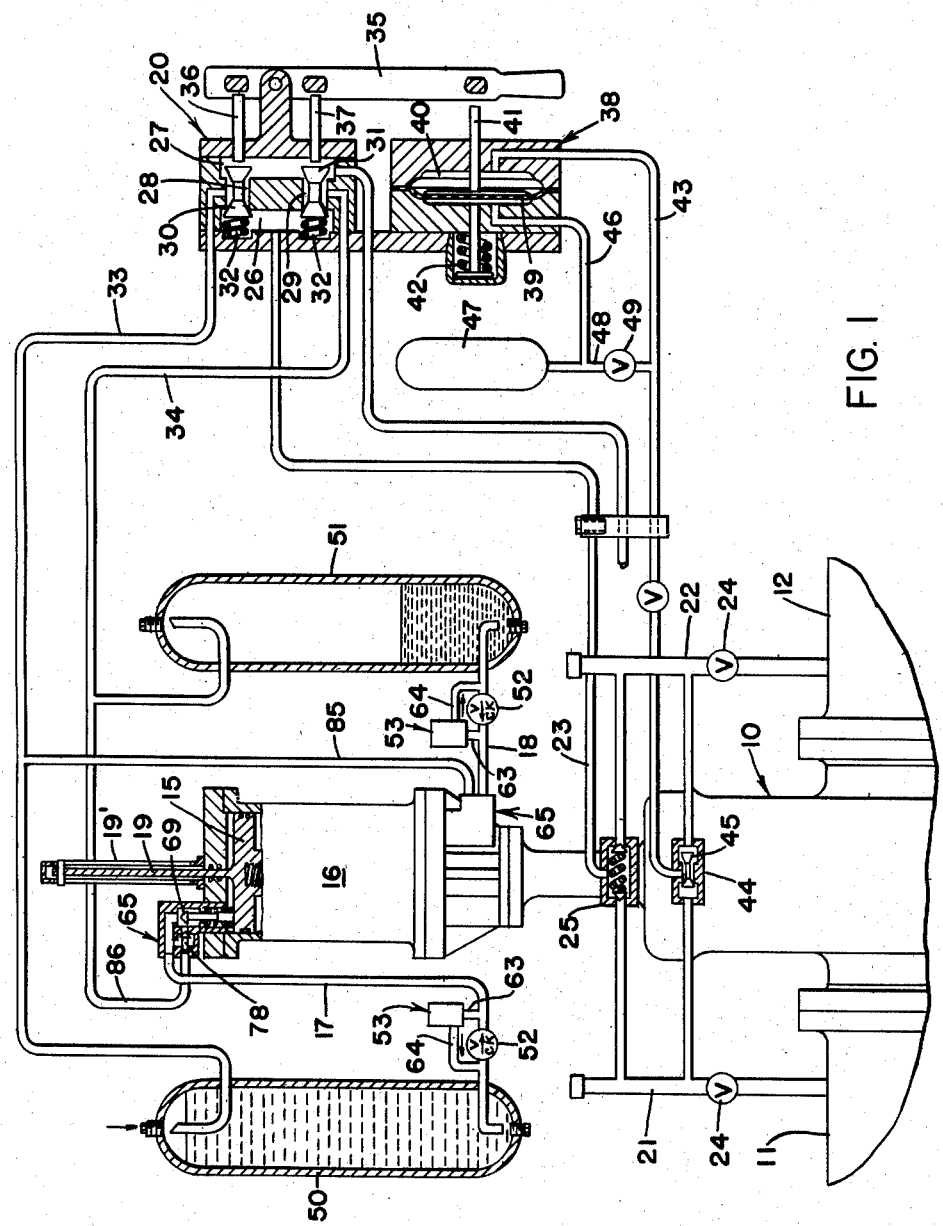
Fig. 1 is a schematic view showing a piston-cylinder operator for a gate valve in a pipe line and the control system for automatically operating the valve using pressure derived from the pipe line, the piston of the operator being raised.
Figure 2:
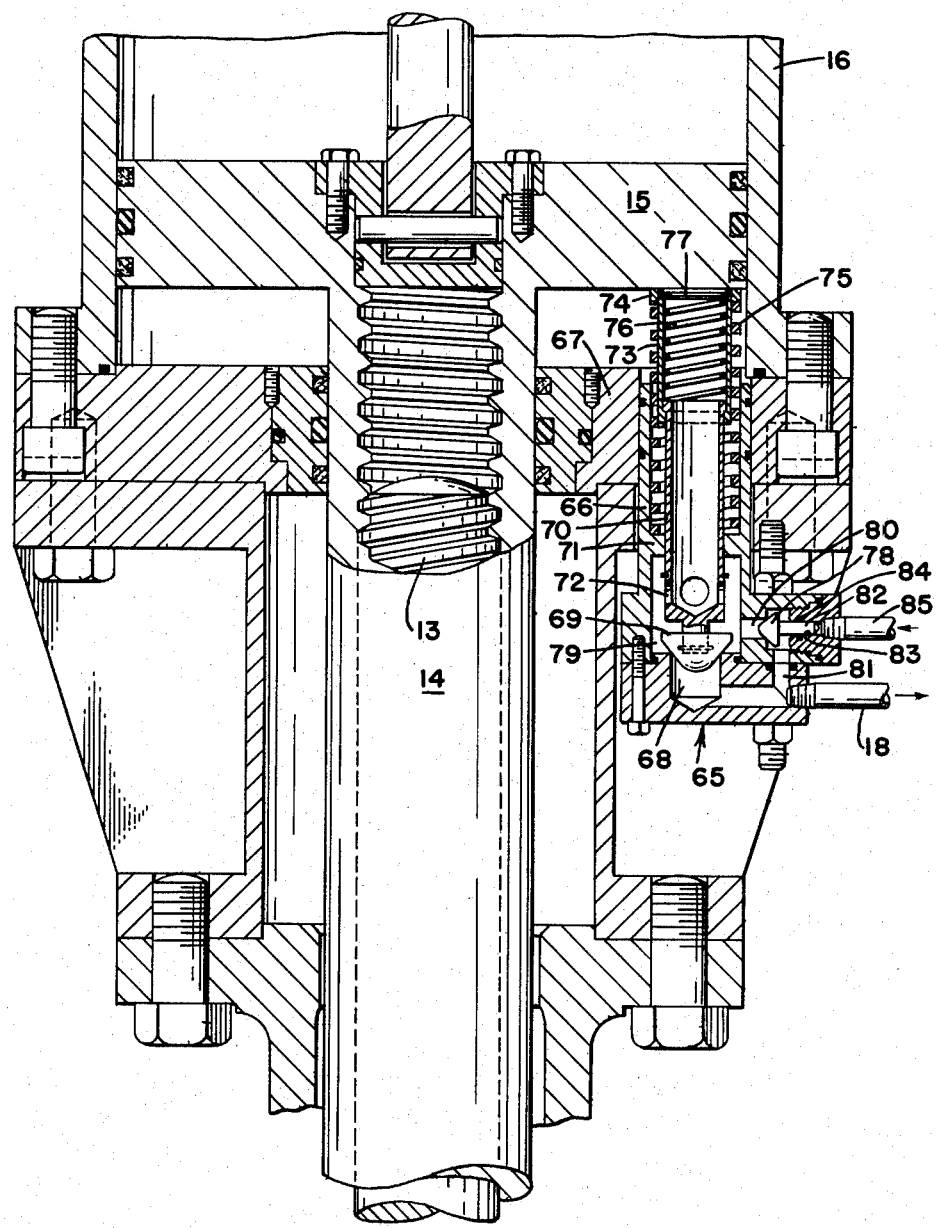
Fig. 2 is an enlarged fragmentary vertical sectional view through the lower part of the cylinder of the operator with the piston lowered.

Referring to Fig. 1, the gate valve is shown generally at 10 connected between two sections 11 and 12 of the pipe line. As indicated in Fig. 2, the valve stem 13 of the valve is connected to the piston rod 14 of the piston 15 which is reciprocable in the cylinder 16 of the operator.

The upper end of the cylinder 16 has a fluid conduit 17 connected thereto and the lower end has a conduit 18 connected thereto. These conduits alternately supply and exhaust fluid to and from opposite ends of the cylinder to reciprocate the piston 15 and raise and lower the valve stem 13. An indicator rod 19 extends upwardly from the piston into an indicator tube 19′.

The pipe line is connected to a control valve indicated generally at 20 and the control unit is connected to the operator cylinder 16. Preferably, tap lines 21 and 22 from pipe line sections 11 and 12 are both connected to a power line 23 for supplying fluid pressure to the control unit, and shut-off valves 24 are provided in the lines 21 and 22.

As shown, tap lines 21 and 22 may be connected to opposite ends of a double check valve 25 with the power line 23 taking off between the valve elements, so that power will be supplied from either side of the line if there is a break on the other side.

The power line 23 is connected to the pressure chamber 26 of the control valve 20, which has an exhaust chamber 27 communicating with chamber 26 through ports 28 and 29. Double-headed poppet valves 30 and 31 are movable in the ports 28 and 29 for alternately closing the opposite ends thereof, and springs 32 normally hold the valves in position closing off the pressure chamber. The ports 28 and 29 are connected between their ends to conduits 33 and 34, respectively, leading to opposite ends of the cylinder 16, so that when the pressure chamber 26 is closed off by the valves, the conduits 33 and 34 are both connected to the exhaust chamber 27.

A handle 35 is pivoted on the valve unit at 36 for opening one or the other of the valves 30 and 31 by means of actuating rods 36 and 37, and controlling the flow of power fluid from line 23 to one end or the other of the cylinder 16, while exhausting it from the opposite end. For automatic operation to close the gate valve, as in the case of a line break, the outer end of handle 35 is arranged to be actuated by a pressure-operated pilot indicated generally at 38, controlled by pressure drop in the pipe line.

The pilot 38 may have a flexible diaphragm 39 movable in a chamber 40 and connected to a stem 41 for actuating the handle. A spring 42 normally holds the stem in neutral position. The side of the chamber 40 opposite to the spring 42 is connected to the pipe line by a conduit 43, which is preferably connected to a shuttle valve 44 connected between the tap lines 21 and 22. The shuttle valve has a double-headed valve element 45 movable in a port connecting the ends of the valve, the port being connected between its ends to conduit 43. Thus, the shuttle valve always connects the conduit 43 to the low pressure side of the pipe line.

The other side of diaphragm chamber 40 is connected by a conduit 46 to a storage tank 47, and conduit 46 is a cross connected by a conduit 48 to the conduit 43, In the conduit 48 is an adjustable restricted orifice represented by valve 49, so that in the event of a line break, the fluid in storage tank 47 will operate the diaphragm 39 and actuate the handle 35 of the control valve to lower the piston and close the gate valve.

Preferably, the pressure fluid in conduits 33 and 34 leading from the control valve to the operator is arranged to force a liquid such as oil into one end of cylinder 16 and out of the other end in a closed circuit, so that flow to and from the cylinder is more effectively controlled. Accordingly, conduit 33 is connected to the upper end of an oil tank 50, and conduit 34 is connected to the upper end of an oil tank 51. The lower end of tank 50 is connected by conduit 17 to the upper end of the cylinder 16 and the lower end of tank 51 is connected by conduit 18 to the lower end of cylinder 16.

Each of the conduits 17 and 18 is preferably provided with a check valve 52 permitting flow from the power source to the cylinder 16 and preventing flow in the opposite direction, and with a relief valve 53 for by-passing the check valve and permitting flow from the cylinder to exhaust only when the pressure exceeds the predetermined amount for which the relief valve is set. This arrangement acts as a hydraulic latch for holding the piston at any intermediate position to maintain the gate valve in partially open position. If desired, the check valves 52 may be replaced with relief valves similar to the valves 53.

Figure 3:
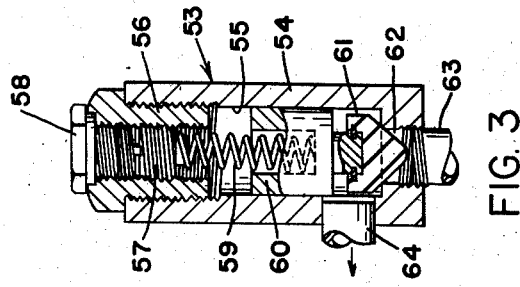
Fig. 3 is an enlarged fragmentary view of one of the relief valves forming part of a hydraulic latch in the fluid conduits leading to and from opposite ends of operator cylinder.

As shown in Fig. 3, the relief valves 53 may each include a tubular housing 54 having a bore 55 which is internally threaded at one end for receiving a tubular nut 56. The nut 56 has an internally threaded bore in which an adjusting nut 57 is screwed, and a plug 58 may also be screwed in the outer end of the nut to close the bore thereof. The adjusting nut 57 abuts one end of a compression spring 59 received in a socket in a valve guide 60 carrying a resilient valve head 61 on its lower end for seating on a port 62. A conduit 63 connects the port 62 to conduit 18 (or 17) leading to the cylinder, and a conduit 64 connects conduit 18 to the bore of the relief valve above the valve head 61.

The conduits 17 and 18 are connected to the ends of cylinder 16 by snubber mechanisms indicated generally at 65. The snubber mechanisms 65 are identical and only the lower one will be described in detail. The snubber mechanism preferably includes a tubular conduit or housing 66 having its inner end extending through the end wall 67 of the cylinder and preferably terminating at or adjacent to the inner surface of said end wall. The outer end of the housing 66 has a port 68 to which the conduit 18 (or 17) is connected, and the snubber valve head 69 is adapted to seat on said port. The valve 69 has a hollow stem 70 slidable through a partition wall 71 in the housing, and side ports 72 below the partition wall conduct fluid into and out of said hollow stem.

The inner open end of stem 70 has an external shoulder telescopically received in an extensible open-ended outer tube 73 having an inner shoulder at its lower end for engaging the outer shoulder on stem 70 to limit the relative extensible movement between tubes 70 and 73. The opposite end of tube 73, which extends into the cylinder, has an external shoulder 74 thereon serving as an abutment for one end of a relatively strong spring 75, the other end of which abuts the partition wall 71 to urge the outer tube 73 into the cylinder.

A relatively weak spring 76 within the outer tube 73 is interposed between an annular washer 77 at the upper end of the tube and the upper end of hollow stem 70 for urging the stem downwardly toward the port 68. Normally, the strong spring will hold the tube 73 extended and the valve 69 in open position above the port 68, but when the piston 15 nears the end of its stroke and engages the end 74 of the tube 73 to overcome the compression of spring 75, the spring 76 will seat the valve head 69 on port 68 and shut off flow to conduit 18 from cylinder 16.

A snubber relief valve 78 is connected through the side of housing 66 into the valve chamber 79 between said port and the partition wall 71. The valve 78 is adapted to seat on a port 80 which connects chamber 79 with a by-pass duct 81 leading around the valve 69 to the port 68. The stem 82 of relief valve 78 extends slidably through a bore 83 in the relief valve housing, and an O-ring seal 84 is provided around the stem. The bore 82 is connected by a conduit 85 with the conduit 33 (Fig. 1) supplying pressure to the opposite end of the cylinder 16. A conduit 86 connects the other snubber relief valve to the conduit 34.

In order to set the snubber relief valve 78 for opening at a predetermined reduced pressure substantially proportional to the pressure applied to the piston 15, regardless of variations in the supply pressure, the area of the outer or rear end of the relief valve stem 82 is reduced relative to the area of port 80 to apply the predetermined reduced pressure to the stem. In other words, if the pressure in conduit 85 were the same as the pressure in chamber 79, the pressure holding valve 78 against port 80 would be reduced by the same ratio as the area of the stem 82 bears to the area of the port 80.

In the operation of the improved mechanism, assuming that the piston 15 is lowered to close the gate valve 10 by opening poppet valve 28 and admitting power fluid into conduit 33, as the piston descends the oil in the lower part of the cylinder exhausts through the hollow stem 70 of the open snubber valve 69 and through the port 68 into the conduit 34 which is connected to exhaust. The power fluid from conduit 33 opens the upper snubber valve and forces the piston downwardly, during which time the snubber relief valve in the upper snubber valve housing is held closed by power fluid flowing behind the relief valve through the by-pass.

When the piston engages the outer tube 73 of the lower snubber valve mechanism, the piston overcomes the pressure of spring 75 and spring 76 seats the snubber valve 69 on port 68 to close the valve. The differential pressure on the piston, that is, the line pressure minus the pressure of spring 75, forces the relief valve 78 open to exhaust fluid through the by-pass to exhaust line 18, and the piston completes its downward stroke at a "snubbed" pressure reduced by the amount of pressure holding the relief valve closed. Thus the final seating action of the valve elements in gate valve 10 is accomplished at a substantially reduced pressure, and when flow to the piston is reversed substantially the full line pressure is applied to overcome sticking and unseat the valve elements.

The final seating action of the valve elements occurs before the piston "bottoms" in the cylinder, and when the gate valve has been closed the control valve 20 is returned to neutral, connecting the conduit 33 to exhaust. With pressure relieved on the upper side of the piston 15, if gas or frothy oil containing gas remains in the narrow space below the piston it will tend to expand, and apply pressure to the underside of the piston and open the gate valve. However, since the line 85 behind the relief valve 82 is now connected to exhaust through conduit 85 any pressure below the piston can escape through the relief valve instead of raising the piston, as would be the case if the relief valve were closed by a spring stronger than the pressure below the piston.

Accordingly, the improved snubbing mechanism utilizes a fraction of the line pressure actuating the operator piston to resist opening movement of the snubber relief valve on the exhaust side of the piston while pressure is applied to said piston, and relieves the closing pressure on said snubber relief valve when pressure on said piston is relieved.

What is claimed is:

1. In a piston-cylinder operator for a gate valve having a stem, snubbing mechanism at each end of the cylinder for reducing the pressure transmitted to the valve stem at the end of each piston stroke, said mechanism including a fluid conduit for connecting the end of the operator cylinder alternately with a source of pressure fluid and with exhaust, a snubber valve in said conduit, spring-actuated means normally holding said valve open and extending into the end of said cylinder for engagement with said piston to close the snubber valve near the end of the piston stroke, a pressure relief valve having a front end communicating with said conduit between the cylinder and the snubber valve and having a rear end of reduced area, a by-pass connecting said relief valve with said fluid conduit beyond said snubber valve, and a conduit connecting said reduced area with the fluid supply conduit for the opposite end of the cylinder for urging said relief valve toward closing position at a reduced pressure proportionate to said reduced area.

2. In a piston-cylinder operator for a gate valve having a stem, snubbing mechanism at each end of the cylinder for reducing the pressure transmitted to the valve stem at the end of each piston stroke, said mechanism including a fluid conduit for connecting the end of the operator cylinder alternately with a source of pressure fluid and with exhaust, a snubber valve in said conduit, spring-actuated means normally holding said valve open and extending into the end of said cylinder for engagement with said piston to close the snubber valve near the end of the piston stroke, a pressure relief valve having a front end communicating with said end of the cylinder and having a rear surface of reduced area, a by-pass connecting said relief valve with said fluid conduit beyond said snubber valve, and a conduit connecting said reduced area surface with the fluid supply conduit for the opposite end of the cylinder for urging said relief valve toward closing position at a reduced pressure proportionate to said reduced area.

3. In a piston-cylinder operator for a gate valve having a stem, snubbing mechanism at each end of the cylinder for reducing the pressure transmitted to the valve stem at the end of each piston stroke, said mechanism including a fluid conduit for connecting the end of the operator cylinder alternately with a source of pressure fluid and with exhaust, a snubber valve in said conduit, spring-actuated means normally holding said valve open and extending into the end of said cylinder for engagement with said piston to close the snubber valve near the end of the piston stroke, a pressure relief valve having a valve element for providing communication at one end with said end of the cylinder, the opposite end of said valve element having a reduced area, a by-pass connecting said relief valve with said fluid conduit beyond said snubber valve, and a conduit connecting said reduced area end with the fluid conduit for the opposite end of the cylinder for urging said relief valve element toward closing position at a reduced pressure proportionate to said reduced area.

4. In a piston-cylinder operator for a gate valve having a stem, snubbing mechanism at each end of the cylinder for reducing the pressure transmitted to the valve stem at the end of each piston stroke, said mechanism including a fluid conduit for connecting the end of the operator cylinder alternately with a source of pressure fluid and with exhaust, a snubber valve in said conduit, spring-actuated means normally holding said valve open and extending into the end of said cylinder for engagement with said piston to close the snubber valve near the end of the piston stroke, a pressure relief valve having a valve element for providing communication at one end between the snubber valve and said end of the cylinder, the opposite end of said valve element having a reduced area, a by-pass connecting said relief valve with said fluid conduit beyond said snubber valve, and a conduit connecting said reduced area with the fluid conduit for the opposite end of the cylinder for urging said relief valve element toward closing position at a reduced pressure proportionate to said reduced area.

5. In a piston-cylinder operator for a gate valve having a stem, snubbing mechanism at each end of the cylinder for reducing the pressure transmitted to the valve stem at the end of each piston stroke, said mechanism including a tubular housing extending into the cylinder and connected at its outer end to a fluid conduit for connecting the cylinder alternately with pressure and exhaust, a snubber valve in said housing for completely shutting off flow from the cylinder to said conduit and having a hollow stem extensible into said cylinder, spring means normally holding said stem in extended position with the snubber valve open, said snubber valve adapted to be closed by engagement of said stem with said piston near the end of the piston stroke, a pressure relief valve in said housing communicating with said cylinder having a valve head at one end and a surface of reduced area at the opposite end, a by-pass duct connecting said relief valve to said fluid conduit around said snubber valve, and a conduit connecting said surface of reduced area with the fluid supply conduit for the opposite end of the cylinder.

6. In a piston-cylinder operator for a gate valve having a stem, snubbing mechanism at each end of the cylinder for reducing the pressure transmitted to the stem at the end of each piston stroke, said mechanism including a tubular housing extending endwise into the cylinder and having a fluid port at its outer end for connection alternately with pressure and exhaust, a snubber valve in said housing for seating on said port to completely shut off flow thereto from said cylinder, said snubber valve having a hollow stem extensible into said cylinder, spring means normally holding said stem extended with the snubber valve open, said snubber valve adapted to be closed by engagement of said stem with said piston near the end of the piston stroke, a pressure relief valve in said housing communicating with said cylinder above said snubber valve seat, said pressure relief valve having a head at one end and a surface of reduced area at the opposite end, a by-pass duct in said housing connecting said relief valve to said fluid port, and a conduit connecting said surface of reduced area with the fluid supply for the opposite end of the cylinder.

No references cited.